June 3, 1941.  L. S. EYRICK  2,243,948
WRENCH
Filed Feb. 29, 1940  2 Sheets-Sheet 1

Inventor:
By: Leon S. Eyrick,
Chritton, Wiles, Davis, Hirschl & Dawson
Attorneys

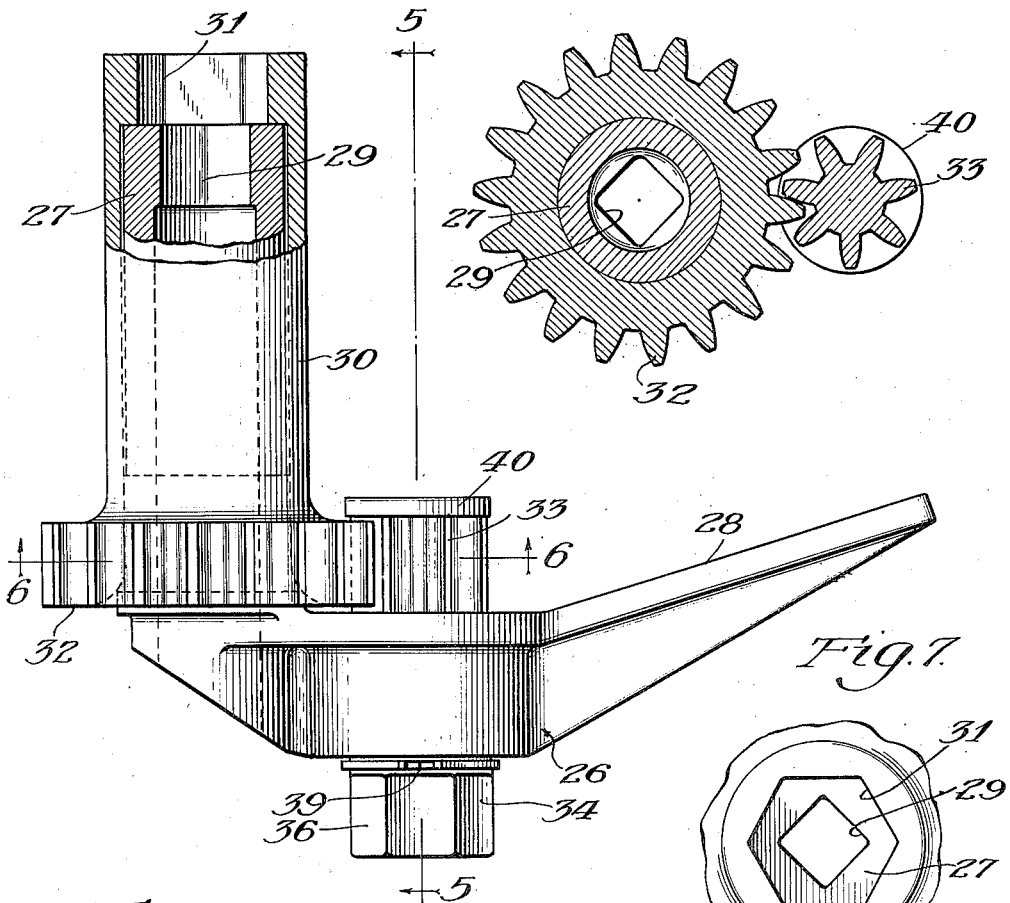
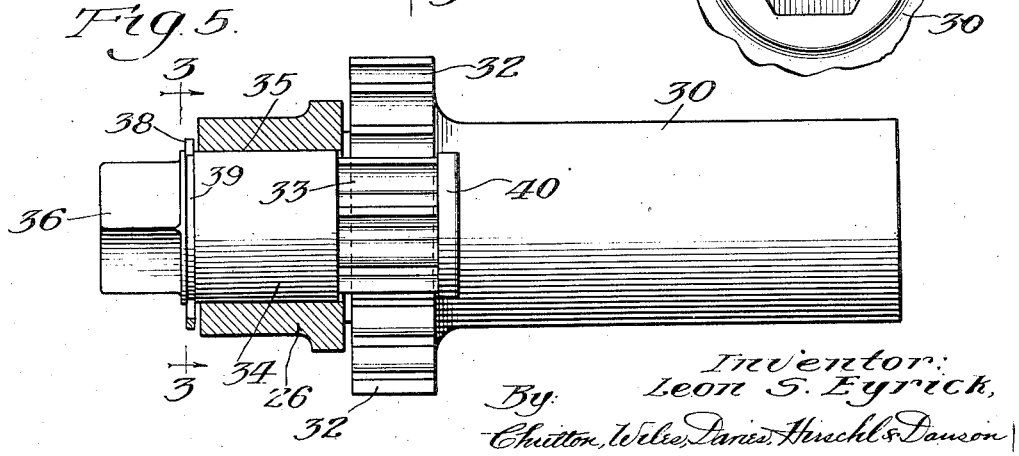

Patented June 3, 1941

2,243,948

UNITED STATES PATENT OFFICE 2,243,948

WRENCH

Leon S. Eyrick, Plainfield, Ill., assignor of one-half to Paul Ales, Joliet, Ill., Application February 29, 1940, Serial No. 321,553

1 Claim. (Cl. 81—56)

My invention relates, generally to wrenches, but as to certain features thereof more particularly to wrenches for removing the retaining nuts for the outer wheels of dual-wheels, viz., wheels having separate tire-equipped inner and outer wheels mounted on the same end of an axle, as is quite common in the case of heavy automobile trucks; and more particularly, though not exclusively, to wrenches for use with that type of dual-wheel known as the Budd dual wheel in which the disk portions of the inner and outer wheels are dished outwardly and inwardly, respectively, to flatwise abut inwardly of their outer margins.

Dual wheel structures as commonly provided are held in position on the axle carrying them by a circular series of studs, which are mounted in a hub on the axle and extend through holes in the disk portions of the inner and outer wheels, sleeve nuts which screw on the threaded outer ends of the studs and clamp the inner wheel to the hub and outer nuts which screw on the outer threaded ends of the sleeve nuts and clamp the outer wheel in place, the sleeve nuts and the other nuts which screw thereon being rotatable in the same direction for tightening.

It is necessary in removing the outer nuts, which are loosened one at a time for releasing the outer wheel, that the sleeve nuts be securely held against unscrewing, else impairment of the outer wheel disk, which is lapped by the sleeve nuts, is apt to occur due to forces exerted by the sleeve nuts locally against the outer wheel disk tending to buckle, or otherwise distort, this disk.

While usually the outer nuts may be removed without distorting the sleeve nuts, it often happens that certain of the sleeve nuts and the outer nuts thereon become so tightly connected or bound together in the continued use of the wheels, as by becoming rusted together, that it is very difficult, if not impossible, in some cases, using wrenches, as hitherto provided, to remove all of the outer nuts of the wheel structure without unscrewing at least one of the sleeve nuts rusted to it, frequently causing damage to the outer wheel disk and requiring that the nuts be burned off the removed wheel.

One of my objects is to provide a wrench by which a powerful turning movement may be produced.

Other objects are to provide a construction of wrench by which the outer nuts referred to may be removed without disturbing the sleeve nuts even in the most severe cases of the rusting together of, or otherwise undue tight connection between, the sleeve nuts and the outer nuts; to accomplish this by a novel and simple and sturdy construction of device and one which may be easily operated by a single individual; to provide a construction by which great leverage is caused to be exerted against the outer nuts for removing them; and still other objects as will be manifest from the following description.

Referring to the accompanying drawings:

Figure 4 is a plan view of the wrench certain parts thereof being shown in section to better illustrate certain details.

Figure 5 is a sectional view of the wrench, the section being taken at the line 5—5 on Fig. 4 and viewed in the direction of the arrows.

Figure 6 is a sectional view of the wrench, the section being taken at the line 6—6 on Fig. 4 and viewed in the direction of the arrows; and Figure 7, an end view of the part of the wrench at which it is applied to the sleeve nuts and the outer nuts in position for operation to remove the outer nuts.

Figure 1:
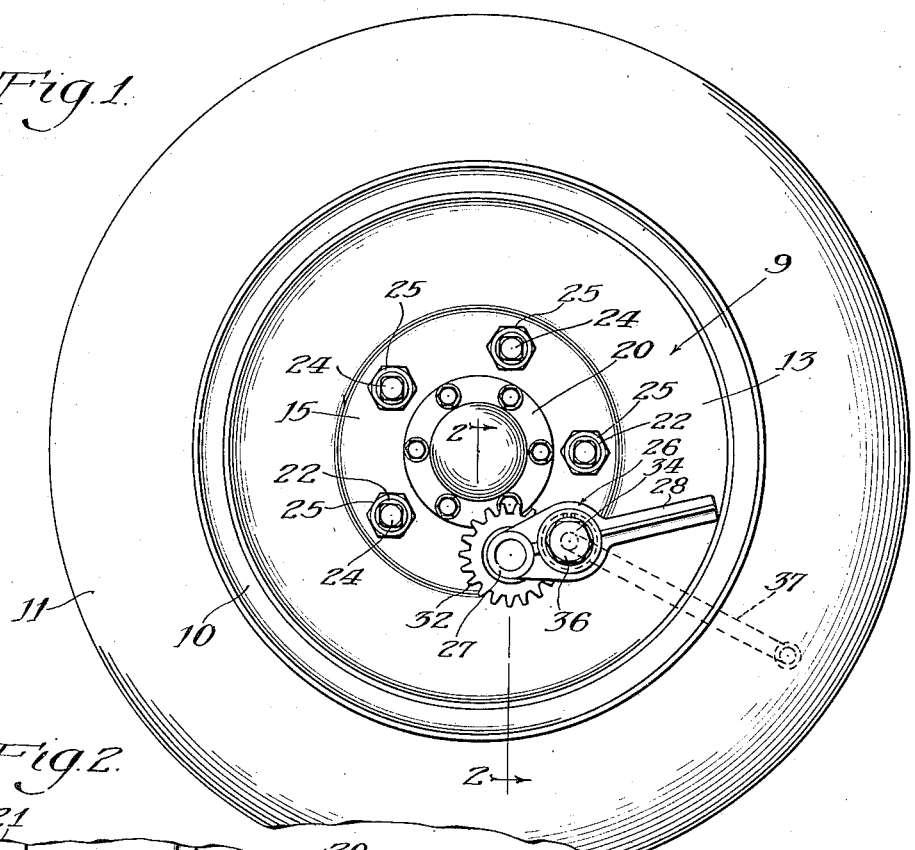
Figure 1 is a face view of a dual-wheel of the type above referred to showing a wrench embodying my invention applied to position thereon for removing one of the outer nuts.

As a preface to a description of my improved wrench, reference is made to the illustrated dual-wheel structure of common construction and which I have chosen to illustrate the general kind of wheel structure for use in connection with which my improved wrench may be used.

The dual wheel structure shown comprises an inner wheel 8 and an outer wheel 9 each provided at its outer periphery with a rim on which a pneumatic tire is mounted, the tires being disposed side-by-side in parallel relation. The rim and tire for the outer wheel only are shown, these being represented at 10 and 11, respectively. The corresponding parts of the inner wheel are of the same construction.

The wheels 8 and 9 are of the disk type, the disks of these wheels being shown at 12 and 13, respectively, the disk 12 being outwardly dished and the disk 13 inwardly dished to flatwise oppose each other at the inner flat ring portions 14 and 15 thereof, apertured, as represented at 16 and 17, to receive the outer ends of a circular series of studs 18 mounted in the peripheral annular flange 19 of a hub 20 secured to the supporting axle (not shown) confined in the axle housing 21.

The inner wheel 8 is clamped at its ring 14 against the flange 19 by sleeve nuts 22 screwed upon the outer threaded ends of the studs 18, the inner ends of the sleeve nuts having beveled heads 23 at which they bear against similar beveled surfaces bounding the openings 16 in the ring 14 and the outer ends being of square form as shown at 24.

The outer wheel 9 is clamped at its ring 15 against the ring 14, and at inner beveled surfaces bounding the apertures 17, against the outer bevel surfaces of the heads 23, by nuts 25 which screw on the outer ends of the sleeve nuts 22, the inner ends of the nuts 25 having beveled surfaces which bear against outer bevel surfaces of the ring 15 bounding the apertures 17 in this ring, the nuts 25, shown as of hex form, terminating inwardly of the squared ends 24 of the sleeve nuts 22.

My improved wrench which is adapted to engage at one part with the squared ends 24 of the sleeve nuts 22 and hold these nuts against turning and at another part with the nuts 25 to unscrew them one at a time, comprises a member 26 of bar form having rigid therewith a hollow cylindrical arm 27 circular in cross section projecting therefrom at one end at substantially a right angle to the bar. The opposite end of the bar 26, inclines inwardly as indicated at 28, to adapt it to engage the rim of the outer wheel 9 for a purpose hereinafter described. The opening in the arm 27 at its inner end is squared as represented at 29 to adapt it to fit over, and interengage with, the squared ends 24 of the sleeve nuts 22, and thus is of the nature of a socket wrench.

Surrounding, and rotatable upon, the arm 27 is a cylindrical sleeve 30 the inner end of which projects inwardly beyond the inner end of the arm 27, the opening through the sleeve 30 at its inner end being of hex form as shown at 31 to adapt it to fit over, and interengage with, the hex nuts 25 and rotate the latter when the sleeve 30 is rotated.

The outer end of the sleeve 30 is provided with a gear 32 fixed thereon and meshing with a gear 33 carried by a shaft 34 journaled in an opening 35 in the bar 26 and having a hex outer end 36 for receiving a tool, as for example a jaw wrench or a socket wrench, for rotating it to drive the gears 33 and 32, a wrench of the socket, crank type being shown at 37 by dotted lines, in position for actuating the shaft 34.

The shaft 34 is shown as held against inward longitudinal displacement in the bar 26 by a spring clip 38 mounted in a peripheral groove 39 in the shaft 34, and is held against outward longitudinal displacement by a flange 40 on the inner end of the shaft 34 lapping a side of the gear 32, the flange 40 serving to hold the sleeve 30 against inward longitudinal displacement.

The gear 33 is preferably much smaller than the gear 32, a substantially 1 to 3 ratio being shown, to permit the operator in actuating the shaft 34 to exert powerful leverage on the sleeve 30 for rotating the latter.

Figures 2, 3:
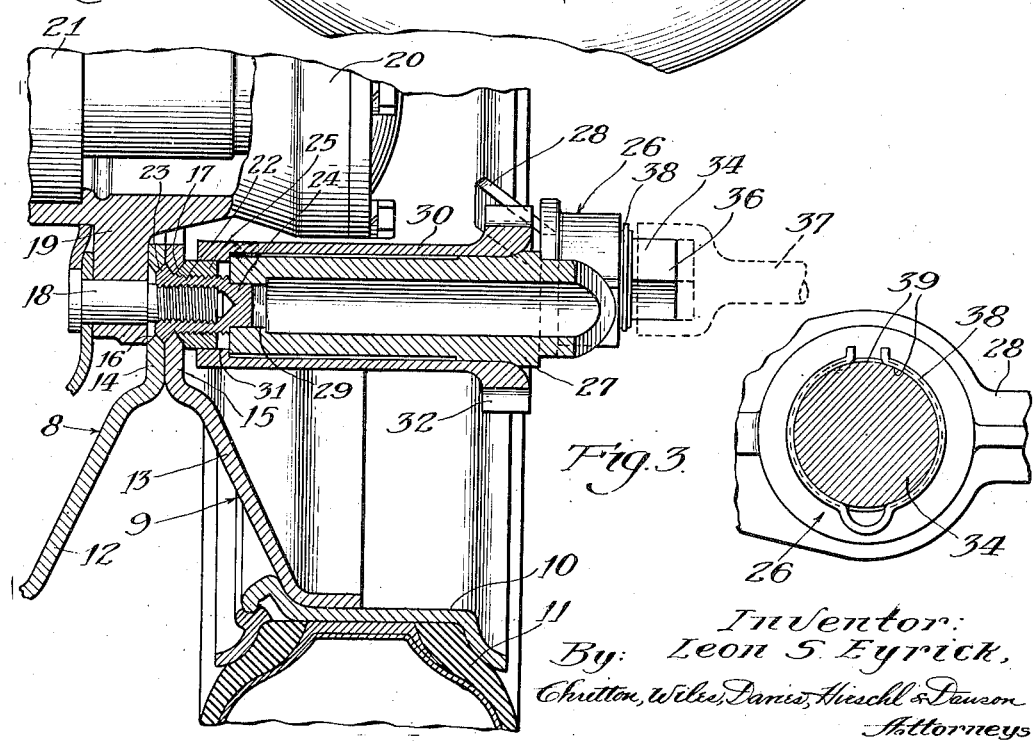
Figure 2 is an enlarged fragmentary sectional view of the assembly shown in Fig. 1, the section being taken at the irregular line 2—2 on Fig. 1 and viewed in the direction of the arrows.
Figure 3 is a fragmentary sectional view of the wrench, the section being taken at the line 3—3 on Fig. 5 and viewed in the direction of the arrows.

In the use of the wrench it is applied to the sleeve nut and the outer nut on one of the studs 18 as shown and above described, the end 28 of the bar 27 bearing against the rim of the outer wheel 9 as shown in Figs. 1 and 2. The operator then rotates the shaft 34 clockwise in Fig. 1, as by means of the wrench 37, the initial reaction of the wrench to such rotation being between the bar 27 and the rim which it engages, the bar forcibly pressing against the rim. The bar 26 and consequently the arm 27 being thus held against turning, continued clockwise rotation of the shaft rotates the sleeve 30 on the arm thus unscrewing the outer nut while positively holding the associated sleeve nut against turning with it, it being understood that the tighter the binding of the outer nut to the sleeve nut, the greater the force exerted by the arm 27 against the rim of the wheel producing the desired reaction for ensuring the unscrewing of the outer nut from the sleeve nut.

The operation above described is repeated for the nuts on each of the other studs of the series thereof.

It has been discovered, in the use of the wrench, that the wrench firmly engages the nuts and slipping of the wrench out of engagement with the nuts, even when the nuts are worn, does not occur.

It will be understood that should the sleeve nut be loose when the wrench is applied to operative position the rotation of the bar 26 to engage it with the rim as stated tightens the sleeve nut, removing side strain on the stud in the nut-unscrewing operation, and in any event limits rotation of the bar sufficiently to prevent stripping of the interengaging threads on the stud and sleeve nuts.

While I have illustrated and described a particular construction embodying my invention and designed for a special use, I do not wish to be understood as intending to limit it thereto as the same may be variously modified and altered and the invention embodied in other forms of structure without departing from the spirit of the invention.

What I claim as new and desire to secure by Letters Patent, is:

A wrench for a dual-wheel structure comprising a bar having at one end a hollow arm extending at an angle thereto, the opposite end of the bar inclining inwardly, said arm having a socket at one end for engaging the sleeve nut for the inner wheel, a sleeve surrounding and journaled on, said arm and having a socket for engaging the nut for the outer wheel, a gear on said sleeve, an actuating shaft journaled in said bar, and a gear on said shaft meshing with said gear on said sleeve, said bar adapted at its inclined end to abut a part of the wheel structure and hold said first-named member against rotation when turning movement is imparted to said second member for unscrewing the nut for the outer wheel.

LEON S. EYRICK.